(12) United States Patent
Tan et al.

(10) Patent No.: US 7,716,129 B1
(45) Date of Patent: May 11, 2010

(54) ELECTRONIC PAYMENT METHODS

(76) Inventors: Beng Teck Alvin Tan, Blk 995 Bukit Timah Road, #06-02, Singapore (SG) 589632; Chi Wui Francis Chow, Apt. Block 435 Clementi Avenue 3, #10-222, Singapore (SG) 120435

( * ) Notice: Subject to any disclaimer, the term of this patent is extended or adjusted under 35 U.S.C. 154(b) by 1652 days.

(21) Appl. No.: 10/362,438

(22) PCT Filed: Aug. 22, 2000

(86) PCT No.: PCT/SG00/00120

§ 371 (c)(1),
(2), (4) Date: Feb. 20, 2003

(87) PCT Pub. No.: WO02/17181

PCT Pub. Date: Feb. 28, 2002

(51) Int. Cl.
*G06Q 40/00* (2006.01)
(52) U.S. Cl. .............................. 705/40; 705/35; 705/39; 705/44
(58) Field of Classification Search .................. 705/35, 705/39–44
See application file for complete search history.

(56) References Cited

U.S. PATENT DOCUMENTS

| | | | |
|---|---|---|---|
| 5,809,143 A | 9/1998 | Hughes | |
| 5,940,511 A | 8/1999 | Wilfong | |
| 6,032,859 A | 3/2000 | Muehlberger et al. | |
| 6,230,148 B1 * | 5/2001 | Pare et al. | 705/40 |
| 2001/0032878 A1 * | 10/2001 | Tsiounis et al. | 235/379 |
| 2003/0069844 A1 * | 4/2003 | Koren | 705/40 |

FOREIGN PATENT DOCUMENTS

| | | |
|---|---|---|
| EP | 0 880 116 A1 | 11/1998 |
| EP | 0 884 703 A2 | 12/1998 |
| WO | WO 98/22915 | 5/1998 |
| WO | WO 98/30985 | 7/1998 |
| WO | WO 98/58339 | 12/1998 |
| WO | WO 99/49404 | 9/1999 |
| WO | WO 00/45247 | 8/2000 |

OTHER PUBLICATIONS

U.S. Appl. No. 60/191,454.*
U.S. Appl. No. 60/181,224.*
International Search Report, dated Dec. 18, 2000.

* cited by examiner

*Primary Examiner*—Lalita M Hamilton
(74) *Attorney, Agent, or Firm*—TraskBritt

(57) ABSTRACT

In an electronic payment method, the payer transmits to an authentication agency details of a proposed payment including an identifier associated with the payer, an identifier associated with the payee, and the payment amount. The authentication agency creates an authentication code relating to the payment and transmits it to a communications device associated with the payer. The payer receives the authentication code on the payer's communications device and transmits it, together with a secret identification code, back to the authentication agency. The authentication agency verifies the authentication code and the secret identification code and authorizes payment. Thereafter, a customer agency pays the payment amount to the payee.

8 Claims, 8 Drawing Sheets

ELECTRONIC PAYMENT METHODS

BACKGROUND OF THE INVENTION

1. Field of the Invention

This invention relates to electronic payment methods. It relates particularly but not exclusively to methods of making a payment over the Internet, a method of making an electronic payment for the purchase of goods and/or services, a method of an account holder with a financial institution withdrawing cash from an automatic teller machine, a method of authenticating electronic payments and a system for authenticating electronic payments.

2. State of the Art

Presently, credit card payment transactions over the Internet operate under the same framework as mail orders or telephone orders (MOTO). In MOTO transactions, the credit card is not present. There is no way for the merchant to verify the legitimacy of the customer's card or identity before confirming the order. Under the MOTO framework, the merchant carries all the risk for fraudulent credit card use.

In a typical credit card transaction, in addition to the customer and merchant, the parties involved in a credit card transaction include:

(a) The merchant bank: the bank where the merchant account is located;
(b) The acquiring bank: a bank that specializes in managing credit card transactions for merchants. Usually the acquiring bank is the same as the merchant bank but this is not necessarily the case;
(c) The credit card network: the communications network that connects issuing and acquiring banks; built by the card associations such as AMEX®, MASTERCARD® and VISA®; and
(d) The issuing bank: the company that issues the credit card to the customer.

The basic payment transaction process works in the manner illustrated in FIG. 1:

(1) The customer sends his or her credit card number, name, billing address, and other details of the transaction to the merchant through the Internet.
(2) The merchant forwards the transaction details and card number to the acquiring bank.
(3) The acquiring bank sends the transaction data and the request through the card association network to the issuing bank.
(4) The issuing bank performs a variety of security checks, including available funds and card number validation.
(5) The issuing bank tells the credit card network whether or not the transaction is approved.
(6) The credit card network notifies the acquiring bank.
(7) The acquiring bank notifies the merchant and if approved, the merchant fulfills the order.
(8) At the end of day, the merchant sends a request to the acquiring bank to capture the funds.
(9) The acquiring bank forwards the request through the credit card network to the issuing bank.
(10) Transactions are settled when the issuing bank pays the acquiring bank and the acquiring bank transfers the funds into the merchant bank account (less the bank's fees for servicing the transaction).
(11) The credit card statement shows up in the customer's credit card statement with line-item details of the transaction, including the name of the merchant company as set up with the acquiring bank. The customer pays the issuing bank the balance due at a later time.

Presently, the credit card is the most favored form of payment for business-to-consumer purchases. However, this is a relatively insecure form of payment and can be repudiated by the consumer, as there are no means of authenticating the identity of the purchaser. Online credit card fraud is common; according to one estimate, online credit card fraud was USD 1 billion in 1999, and it is estimated that online fraud will grow by more than 50% each year.

An object of the present invention is to provide a payment method which is more secure than the current Internet credit card payment method.

BRIEF SUMMARY OF THE INVENTION

According to a first aspect of the present invention, there is provided a method of making a payment over the Internet from a payer to a payee, including the following steps:

(1) the payer accesses an Internet server from a computer or an Internet device associated with the payer and transmits to the Internet server details of a proposed payment including an identifier associated with the payer;
(2) the payer's identifier, an identifier associated with the payee, and the payment amount are transmitted from the Internet server to an authentication agency;
(3) the authentication agency creates an authentication code relating to the payment and transmits it to a communications device associated with the payer;
(4) the payer receives the authentication code on the payer's communications device and transmits it, together with a secret identification code back to the authentication agency;
(5) the authentication agency verifies the authentication code and the secret identification code and authorizes payment; and
(6) a customer agency pays the payment amount to the payee.

The payer is preferably pre-registered with the authentication agency, so that the payer has an agreed identifier and secret identification code. The payer's communications device is also preferably pre-registered with the authentication agency, so that, upon receiving the payer's identifier, the authentication agency has sufficient information to forward the authentication code to the payer's communications device. Alternatively or additionally, the payer may transmit to the Internet server details sufficient for contacting the payer's communications device, at the same time as the payer transmits the payer's identifier and proposed payment details.

The payee may be a provider of goods or services. The Internet server may be associated with or operated by the payee. Alternatively, the Internet server may be operated by an electronic commerce service provider. As an alternative to being a provider of goods and services, the payee may simply be a private individual to whom the payer wishes to make a payment.

It is preferred that, upon transmitting details of a proposed payment to the Internet server, the payee receive an acknowledgement or authorization code.

The authentication and authorization code may be generated in any suitable manner by the authentication agency. It is preferred that authentication and authorization codes be unique for each transaction, and be generated according to an algorithm which prevents prediction of future authentication codes.

The payer's communications device may be any suitable communications device. It is preferred that the payer's communications device is one of the following types of mobile communications devices:

(a) a mobile telephone;
(b) a personal digital assistant;
(c) a pager; or
(d) a palmtop computer.

The payer may transmit the authentication code and secret identification code to the authentication agency in any suitable manner. The codes may be transmitted using the communications device, or they may be transmitted from the payer's computer or Internet device. In a preferred arrangement, the authentication agency, after transmitting the authentication code to the payer's communications device, transmits a message to the payer's computer or Internet device prompting the payer to enter the authentication code and the payer's secret identification code, whereafter the authentication code and the secret identification code are transmitted back from the payer's computer or Internet device to the authentication agency over the Internet.

After verification of the authentication code and the secret identification code, payment by the customer agency may be arranged in any suitable manner. The authentication agency and the customer agency may be the same entity, or they may be separate entities. A message may be transmitted from the authentication agency to the customer agency authorizing the payment. Thereafter, the customer agency may make the payment to the payee and deduct the amount from the payer's account or add the amount to a consolidated statement which is later sent to the payer for payment. A message is also preferably sent to the payee indicating that the payment is approved, so that the payee can safely proceed with the supply of any goods or services to which the payment may relate.

According to a second aspect of the invention, there is provided a method of making a payment over the Internet from a payer to a payee, including the following steps:

(1) the payer accesses an Internet server from a computer or Internet device associated with the payer and transmits to the Internet server details of a proposed payment including an identifier associated with the payer;
(2) the payer's identifier, an identifier associated with the payee, and the payment amount are transmitted from the Internet server to an authentication agency;
(3) the authentication agency creates an authentication code relating to the payment and transmits it to an email address associated with the payer;
(4) the payer receives the authentication code at the payer's email address and transmits it, together with a secret identification code back to the authentication agency;
(5) the authentication agency verifies the authentication code and the secret identification code and authorizes payment; and
(6) a customer agency pays the payment amount to the payee.

In this aspect of the invention, an email address is used as the secondary means of communicating with the payer, in place of a communications device associated with the payer. Many of the optional and preferred features applicable to the first aspect of the invention are applicable to the second aspect and other aspects.

According to a third aspect of the invention, there is provided a method of making a payment over the Internet from a payer to a payee, including the following steps:

(1) the payer enters into an Internet Web site details of a proposed payment including an identifier associated with the payer;
(2) the payer's identifier, an identifier associated with the payee, and the payment amount are transmitted from the Internet Web site to an authentication agency;
(3) the authentication agency transmits a request for a secret identification code to the payer's computer or Internet device or a mobile communications device associated with the payer;
(4) the payer transmits the payer's secret identification code back to the authentication agency using the payer's mobile communications device;
(5) the authentication agency verifies the secret identification code and authorizes payment; and
(6) a customer agency pays the payment amount to the payee.

In this aspect of the invention, secondary communication with the payer occurs by means of a mobile communications device associated with the payer. The mobile communications device may be any suitable device. Particularly suitable devices include:

(a) a mobile telephone;
(b) a personal digital assistant;
(c) a pager; or
(d) a palmtop computer.

According to a fourth aspect of the invention, there is provided a method of making an electronic payment for the purchase of goods and/or services by a purchaser from a vendor, including the following steps:

(1) the purchaser enters into a machine associated with the vendor details of a proposed payment including an identifier associated with the purchaser;
(2) the purchaser's identifier, an identifier associated with the vendor, and the payment amount are transmitted from the vendor's machine to an authentication agency;
(3) the authentication agency transmits a request for a secret identification code to the vendor's machine or a mobile communications device associated with the purchaser;
(4) the purchaser transmits the purchaser's secret identification code back to the authentication agency using the purchaser's mobile communications device;
(5) the authentication agency verifies the secret identification code and authorizes payment; and
(6) a customer agency pays the payment amount to the vendor.

According to a fifth aspect of the invention, there is provided a method of an account holder with a financial institution withdrawing cash from an automatic teller machine, including the following steps:

(1) the account holder enters into the automatic teller machine details of a proposed withdrawal including an identifier associated with the account holder;
(2) the account holder's identifier is transmitted from the automatic teller machine to an authentication agency;
(3) the authentication agency transmits a request for a secret identification code to the automatic teller machine or a mobile communications device associated with the account holder;
(4) the account holder transmits the account holder's secret identification code back to the authentication agency using the account holder's mobile communications device;
(5) the authentication agency verifies the secret identification code and authorizes payment; and
(6) the automatic teller machine dispenses cash to the account holder and the account holder's account with the financial institution is debited accordingly.

According to a sixth aspect of the invention, there is provided a system for authenticating electronic payments, including the following components:

(a) a user registration component, for receiving personal identification and contact details for users;

(b) a user database, for keeping records of users including an identifier associated with each user and a secret identification code associated with each user;

(c) a merchant data exchange component, for receiving electronic payment authorization requests and user identifiers from merchants;

(d) an authentication code creation component for generating authentication codes in response to electronic payment authorization requests;

(e) a messaging services component, for sending authentication codes to users and receiving authentication codes and secret identification codes from users via messaging providers;

(f) a verification component, for verifying authentication codes and secret identification codes; and (g) a customer agency data exchange component, for forwarding authorization messages to customer agencies.

In addition to the components described above, the system may include a transaction recording component, for recording details of authentication transactions.

In addition to the components described above, the system may include a security services component, for applying encryption and security measures to communications with merchants, users and customer agencies.

BRIEF DESCRIPTION OF THE DRAWINGS

The invention will hereinafter be described in greater detail by reference to the attached drawings which show example forms of the invention. It is to be understood that the particularity of those drawings does not supersede the generality of the preceding description of the invention.

DETAILED DESCRIPTION

Payment authentication according to the present invention is based on the Principle of "What You Have and What You Know." In some embodiments, the authentication principle is based on users having physical possession of their mobile device (e.g., phone, pager, personal digital assistant) decoupled from their confidential knowledge of their secret identification code, or PIN.

The invention allows several payment products and services. These include the ability to:

(a) transfer funds from consumer-to-consumer;

(b) pay by debiting the user's bank account;

(c) pay by incurring a credit charge on the user's customer agency bill; and (d) pay by a mobile phone or pre-paid card/wallet.

Utilizing a base of customer agencies, the methods of the present invention will allow users to transact with any online merchant at anytime and any place in the world, with the added convenience of having these online transactions billed in local currency on their customer agency's bill. The methods may also provide the clearing function between merchants and the customer agencies:

Customer agencies may be financial institutions such as banks, they may be associated with large merchants, they may be associated with the authentication agency, or they may be independent organizations.

Prior to using the inventive methods, each new user undertakes a registration process whereby they provide their personal particulars (including their mobile phone number or other authentication device address such as an email address, customer agency and user ID). Once they submit their application, the system will send them a dynamically generated one-time secret identification code or PIN to log onto the system's website. Once they have logged on, the user is required to key in a permanent PIN which they will use every subsequent time they log-in as well as on every online transaction.

In the following descriptions, the trade mark PayPerfect is used to refer to the inventive system and methods, and to the authentication agency which is the main component in the system and methods.

Simple Message Service Authentication

Figure 1:
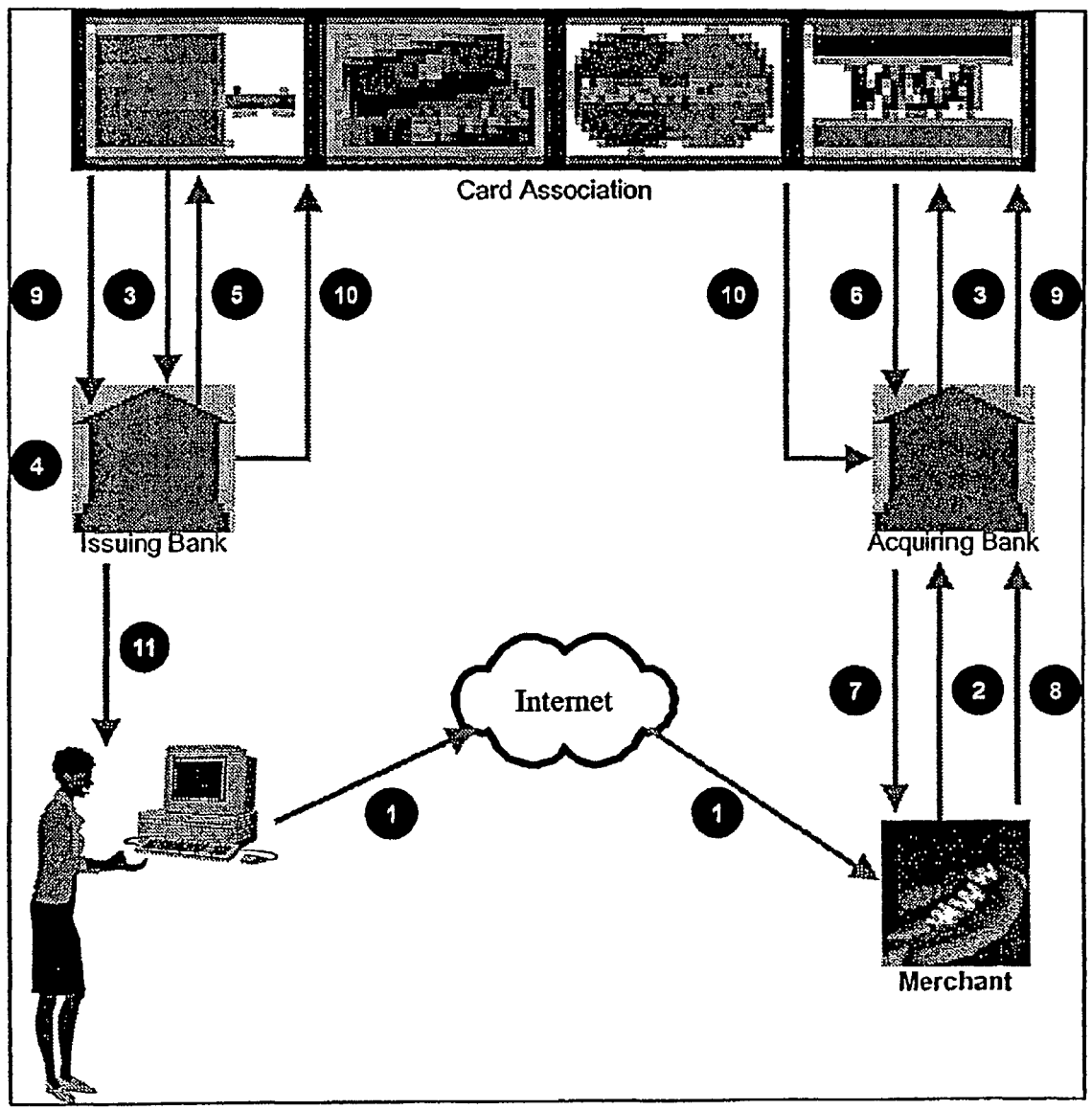
FIG. 1 (prior art) shows a schematic diagram of a typical credit card transaction over the Internet according to current methods.
Figure 2:
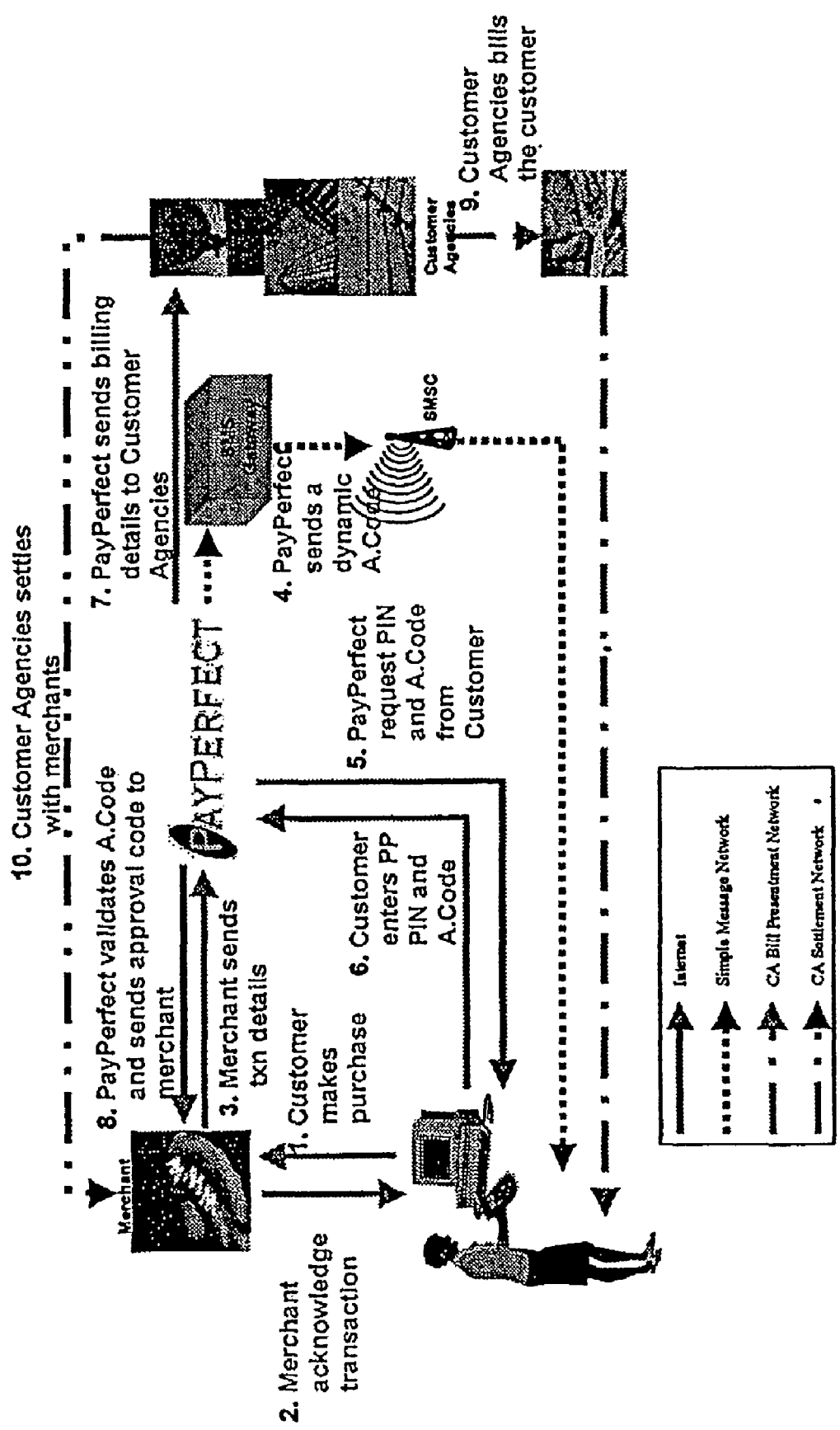
FIG. 2 is a schematic illustration of a method according to one aspect of the invention.

Under this approach, the authentication model is based on delivering a dynamically generated authentication code to an authentication device capable of receiving simple messages (one way messaging) (i.e., mobile phone, pager, personal digital assistant). FIG. 2 outlines this approach, which includes the following steps:

(1) Customer makes purchase through the Internet. Customer chooses PayPerfect as the payment method and enters her authentication device ID (i.e., mobile phone number, pager number, etc.).

(2) Customer gets an immediate acknowledgement of her transaction from the merchant.

(3) Simultaneously, Merchant sends on the customer's transaction details to PayPerfect.

(4) PayPerfect processes the transaction details from the merchants and generates an authentication code and sends it to the customer's authentication device.

(5) Immediately, PayPerfect displays a screen requesting for the customer's PayPerfect user ID and authentication code.

(6) Customer enters her PayPerfect PIN and the transaction Authentication Code.

(7) PayPerfect sends payment approval code to merchant when correct PIN and Authentication Code is entered. PayPerfect also sends payment confirmation to consumer via email or authentication device alert.

(8) PayPerfect sends the billing details to the customer's Customer Agency for payment processing and collection. The type of processing depends on the payment type (i.e., debit, credit, prepaid or funds transfer).

(9) Customer receives itemized bill from her Customer Agency, which includes online purchases.

(10) Customer Agency settles the purchase amount with the merchants.

Email (Dynamically Generated Authentication Code)

Figure 3:
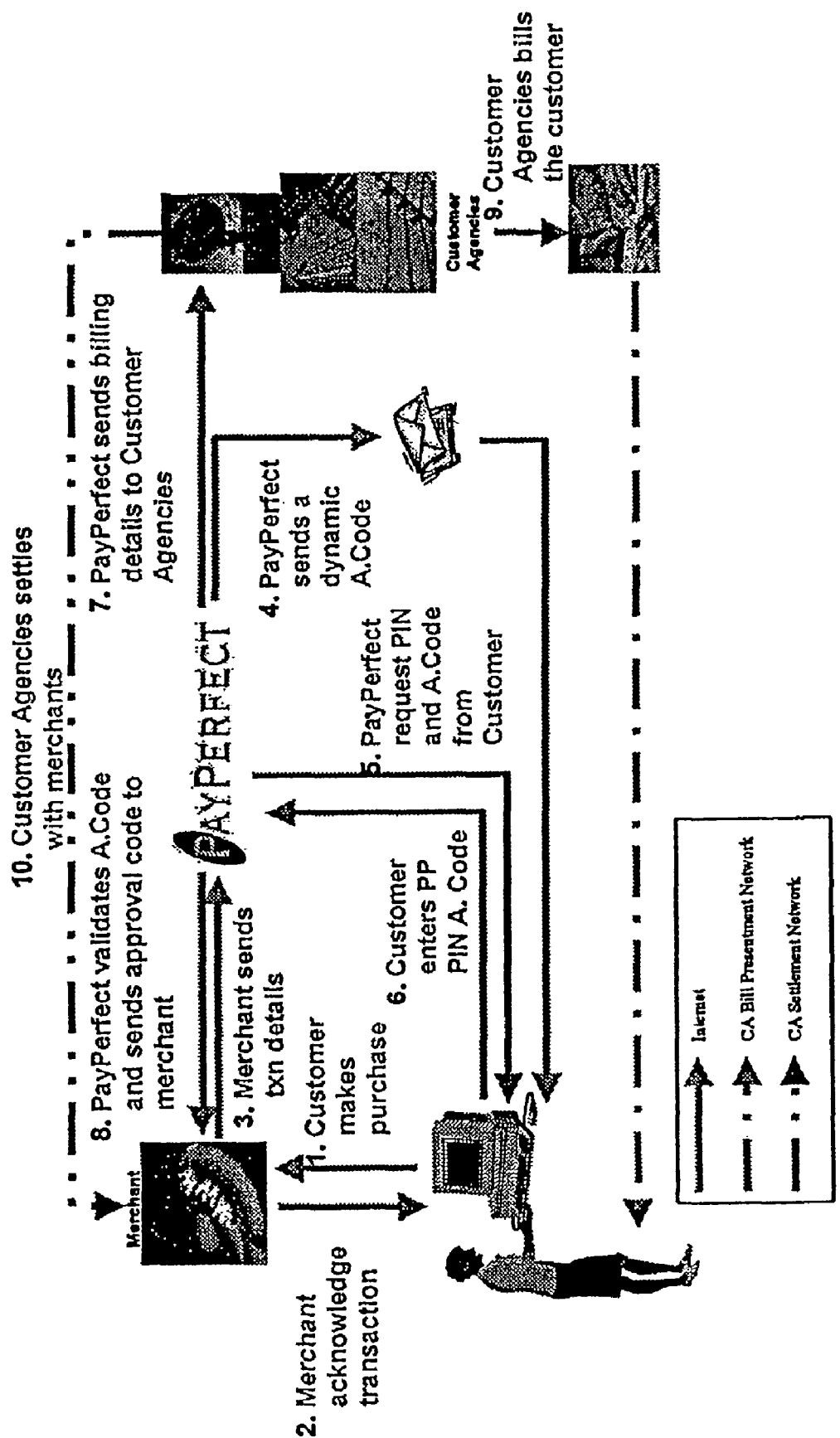
FIG. 3 is a schematic illustration of a method according to another aspect of the invention.

Under this approach, the authentication model is based on delivering a dynamically generated authentication code to the customer's email account. FIG. 3 below outlines this approach, which has the following steps:
  (1) Customer makes purchase through the Internet. Customer chooses PayPerfect as the payment method and enters her authentication device ID (i.e., email account ID).
  (2) Customer gets an immediate acknowledgement of her transaction from the merchant.
  (3) Simultaneously, Merchant sends on the customer's transaction details to PayPerfect.
  (4) PayPerfect processes the transaction details from the merchants and generates an authentication code and sends it to the customer's registered email account.
  (5) Immediately, PayPerfect displays a screen requesting for the customers PayPerfect user ID and authentication code.
  (6) Customer enters her PayPerfect PIN and the transaction Authentication Code.
  (7) PayPerfect sends payment approval code to merchant when correct PIN and Authentication Code is entered. PayPerfect also sends payment confirmation to consumer via email.
  (8) PayPerfect sends the billing details to the customer's Customer Agency for payment processing and collection. The type of processing depends on the payment type (i.e., debit, credit, prepaid or funds transfer).
  (9) Customer receives itemized bill from her Customer Agency, which includes online purchases.
  (10) Customer Agency settles the purchase amount with the merchants.

Over the Air Mobile Application

Figure 4:
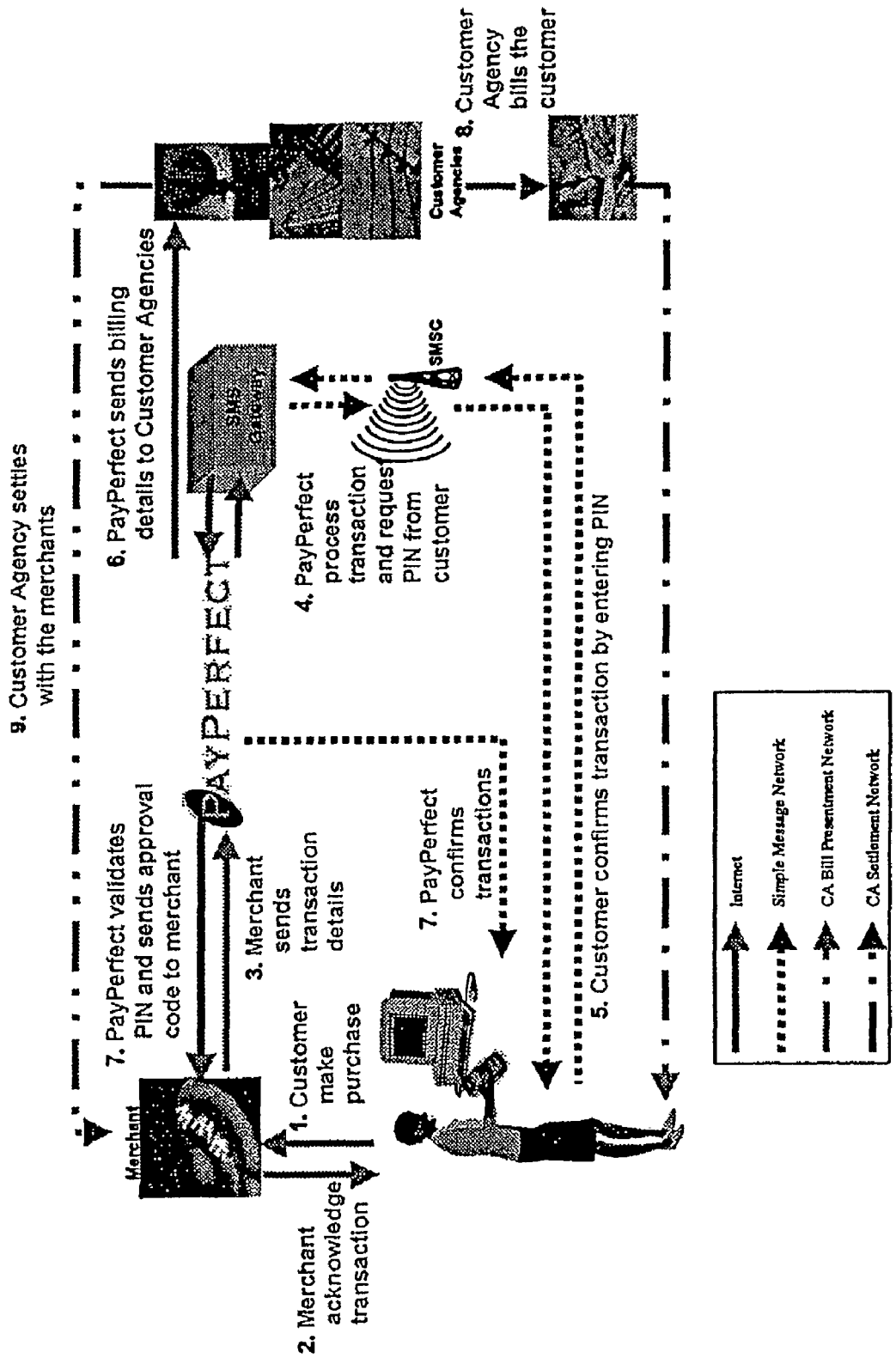
FIG. 4 is a schematic illustration of a method according to another aspect of the invention.

Under this approach, the authentication model is based on the customer authenticating the transaction from their mobile phone. The customer will have a PayPerfect payment application loaded on their mobile phone over the air. The mobile phone will act as an authentication keypad for the customer. FIG. 4 below outlines this approach, which has the following steps:
  (1) Customer makes purchase through the Internet. Customer chooses PayPerfect as the payment method and enters her mobile phone number.
  (2) Customer gets an immediate acknowledgement of her transaction from the merchant.
  (3) Simultaneously, Merchant sends on the customer's transaction details to PayPerfect.
  (4) PayPerfect processes the transaction details from the merchants and requests the PayPerfect PIN from the customer.
  (5) Customer enters her PayPerfect PIN using the mobile phone.
  (6) PayPerfect validates the customer PIN and sends the billing details to the customer's Customer Agency for payment processing and collection when correct PIN is entered. The type of processing depends on the payment type (i.e., debit, credit, prepaid or funds transfer).
  (7) When the correct PIN is entered by the customer, PayPerfect sends the payment approval code to merchant. PayPerfect also sends payment confirmation to consumer via mobile phone/email.
  (8) Customer receives itemized bill from her Customer Agency, which includes online purchases.
  (9) Customer Agency settles the purchase amount with the merchants.

Non-Internet Applications

Figure 5:
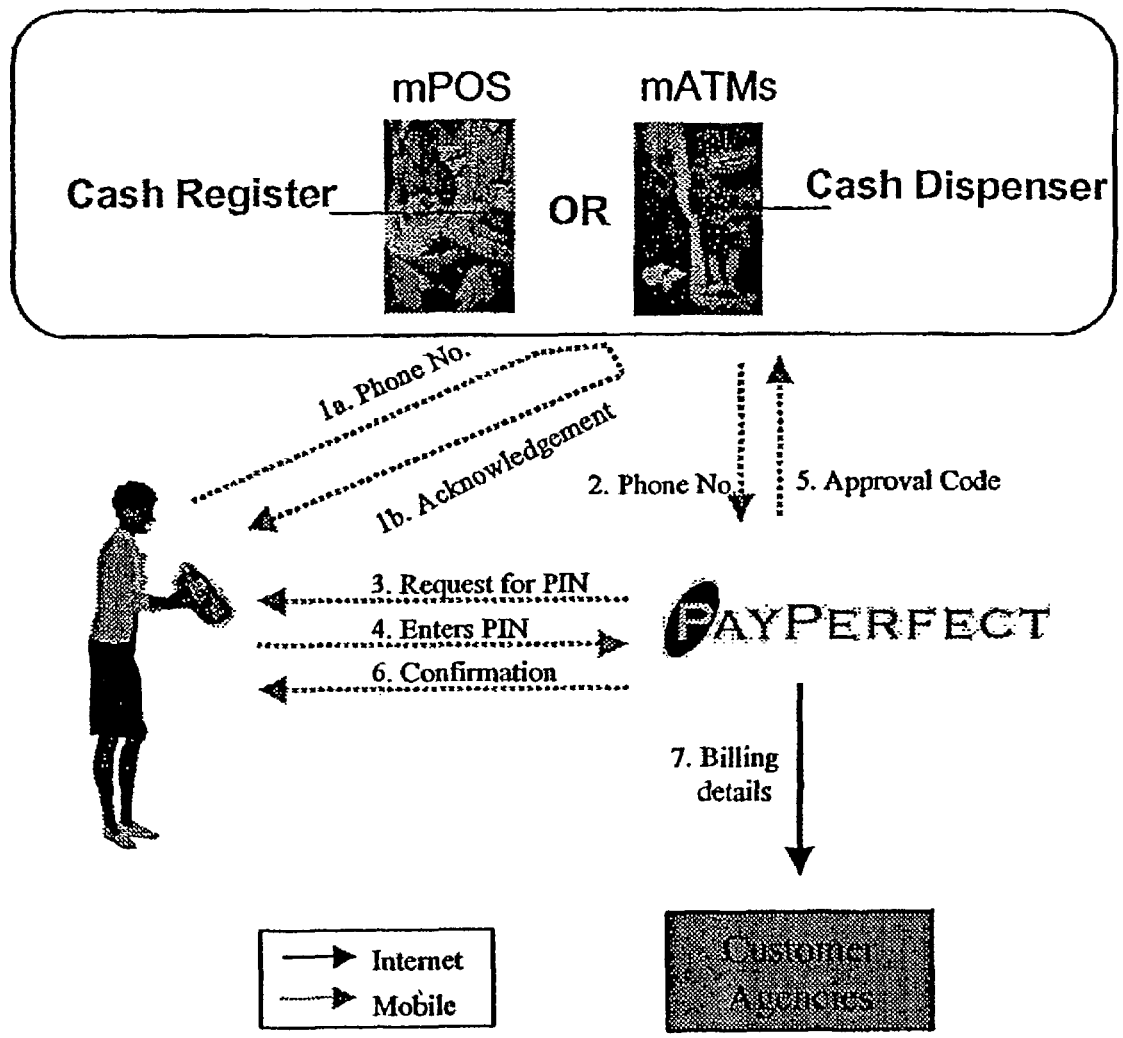
FIG. 5 is a schematic illustration of a method according to another aspect of the invention.

The methods of the present invention can also be applied to non-Internet applications. An application relating to automatic teller machines and point-of-sale equipment is illustrated in FIG. 5. These machines are equipped with wireless technologies which allow communication with the user's mobile device; allowing the user to key in his/her PayPerfect PIN to withdraw cash from ATM machines or pay for the purchase of physical goods and/or services.
  (1) At the cash register or cash dispenser, the user keys in her phone number or other authentication device address. An acknowledgement is received.
  (2) The authentication device address such as the phone number is sent to the PayPerfect authentication agency.
  (3) A request for a PIN is sent to the user's authentication device.
  (4) The user keys in the PIN number and transmits it using her mobile phone or other authentication device to PayPerfect authentication agency. The authentication agency validates the PIN number.
  (5) When the correct PIN is entered by the user, PayPerfect transmits an approval code to the cash register or cash dispenser.
  (6) PayPerfect transmits a confirmation to the user.
  (7) PayPerfect sends the billing details to the Customer Agency for payment processing. The type of payment processing depends on the payment type (i.e., debit, credit, prepaid or funds transfer).

Figure 6:
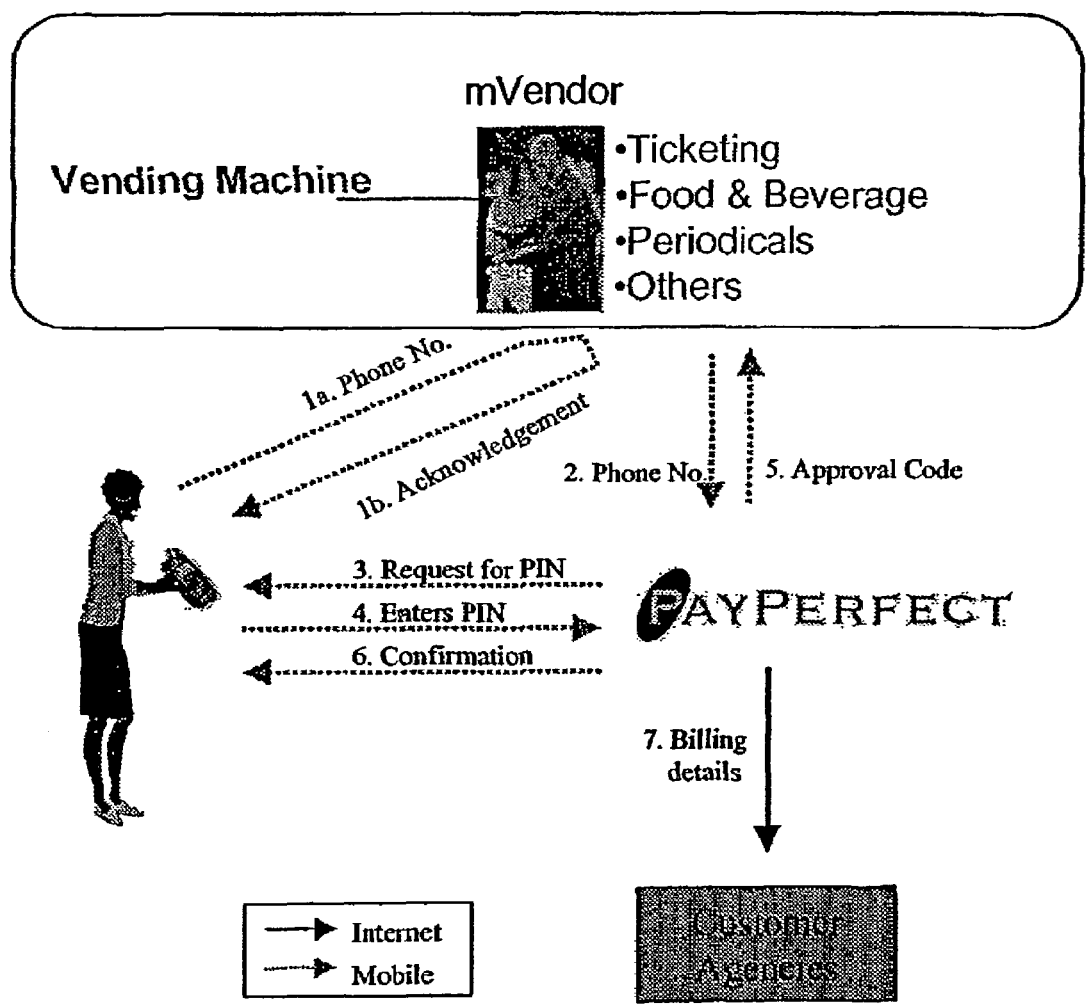
FIG. 6 is a schematic illustration of a method according to another aspect of the invention.

A similar authentication mechanism can be applied in respect of vending machines. These machines are equipped with wireless technologies which allow communication with the user's mobile device; allowing the user to key in his/her PayPerfect PIN to purchase periodicals, tickets, drinks, food, etc. This is illustrated in FIG. 6, which shows the same general workflow as FIG. 5.

Application Architecture

Figure 7:
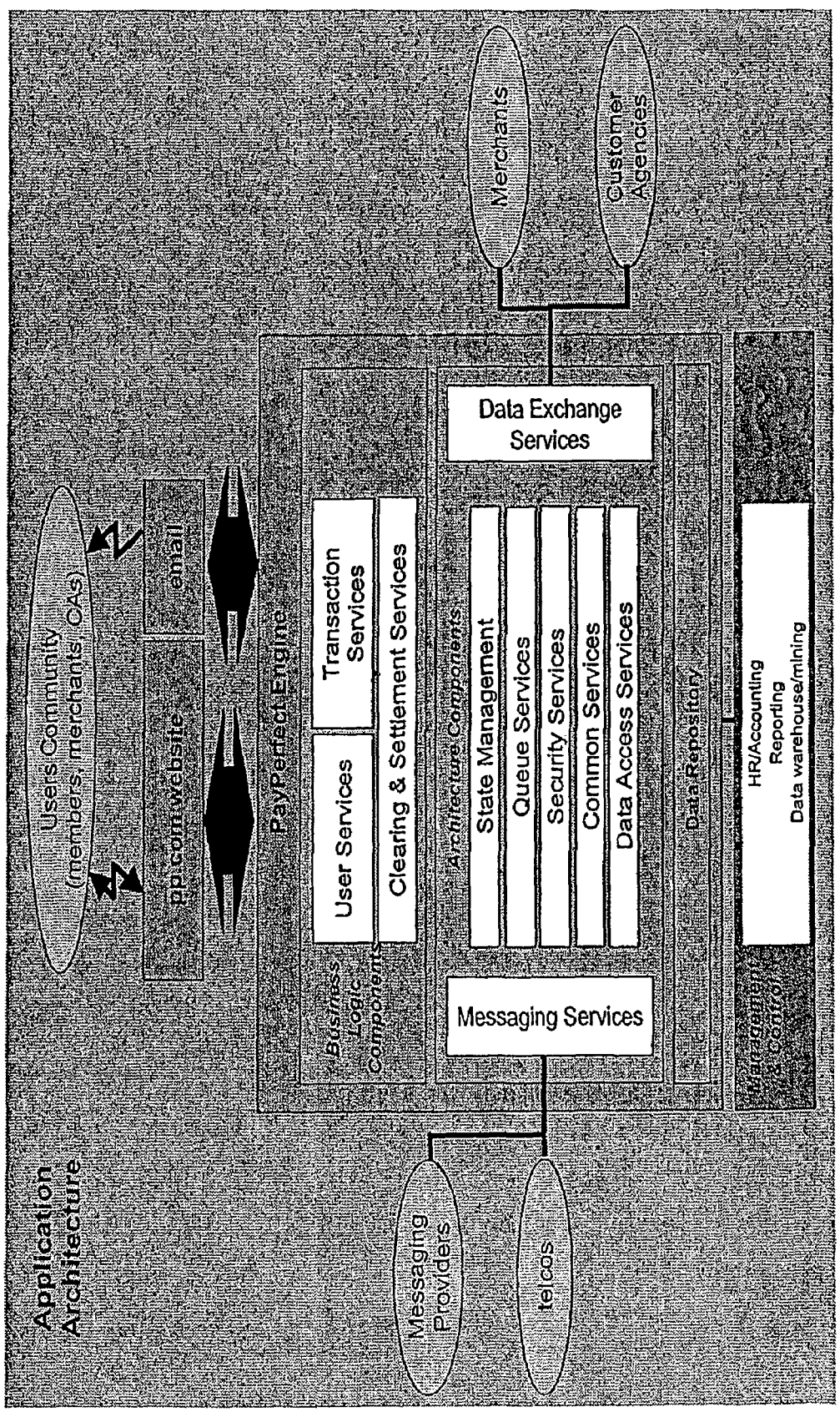
FIG. 7 is a schematic illustration of application architecture suitable for implementing the invention.

One suitable application architecture for implementing the invention is illustrated in FIG. 7.

The architecture comprises three (3) main components: payperfect.com website, PayPerfect engine and Management and Control.

Most of the users, which include members, merchants and customer agencies, interact with PayPerfect via the website and email. Merchants and customer agencies can further interact with PayPerfect via the Data Exchange Services module for purpose of clearing and settlement.

The core engine has seven (7) key modules:

User Services

This module provides account management and technical support to users. Users can register their membership, manage their profile and payment information, review their transaction history, and initiate payment disputes.

Transaction Services

This module processes the payment transaction as initiated by members on merchant sites. Services include access control, limits checking, authentication, confirmation and transaction logging.

Clearing and Settlement

This module handles all the clearing and settlement between customer agencies and PayPerfect, and merchants and PayPerfect. Services include bill consolidation and presentation, bill reconciliation and multi-currency processing and accounting entries generation and posting.

Messaging Services

The Messaging Services module interfaces with messaging providers and/or telcos to provide interaction between PayPerfect and its members' authentication devices (which can be mobile phone, pager, email, etc.). This is the heart of the PayPerfect Authentication Model.

Data Access Services

The Data Access Layer (DAL) consolidates and encapsulates all the internal data access requirements. This enforces a single source for all data access-related codes and ensures ease of maintenance in the future.

Data Exchange Services

This module facilitates the communication between PayPerfect and merchants and customer agencies. Initial implementation supports HTTP, FTP and XML.

Security Services

This module uses the available security options such as 128-bit Secure Socket Layer (SSL), Virtual Private Network (VPN) and Public key Infrastructure (PKI) as necessary. VPN and PKI can be used to secure the data exchange channel between the merchants/Customer Agency and PayPerfect. This provides the additional security required for PayPerfect to authenticate the merchants/Customer Agency, and vice versa.

State Management Services

This module is for the purpose of maintaining information across Web pages, thus overcoming the stateless nature of the Web. The state management module is implemented using a combination of storing session information in the database and querystring. A unique session identifier is stored in the database together with the user ID. This session identifier is stored for as long as the user is logged in, and is updated each time the user goes to the next page. The user is thus identified and protected by this unique identifier, as it prevents people from copying the session identifier and posing as the user to log in directly to any of the PayPerfect web pages. Other information about the user is maintained using the querystring.

Queuing Services

Some modules may require asynchronous processing. These modules can make use of queuing services. The queuing services allow calls to listener functions to be stored in a queue, and processed according to priority and availability of the listener function.

Common Services

Common services provide services like standardized error logging and handling. Other common services are universal date display (depending on user location), currency/exchange rate display and conversion routines.

The Management and Control component is used internally by PayPerfect for reporting operations and risk management.

Technical Architecture

One suitable form of architecture for implementation of the invention may be based primarily on Microsoft Windows Distributed Network Architecture (Windows DNA). Windows DNA provides a scalable architecture for distributed web applications. By utilizing the n-tier computing model of Windows DNA, the PayPerfect core engine can be scaled to meet demand. Windows DNA 2000 development is based on three services tiers: application presentation, business logic and data. This architecture promotes scalability, reusability and extensibility.

Figure 8:
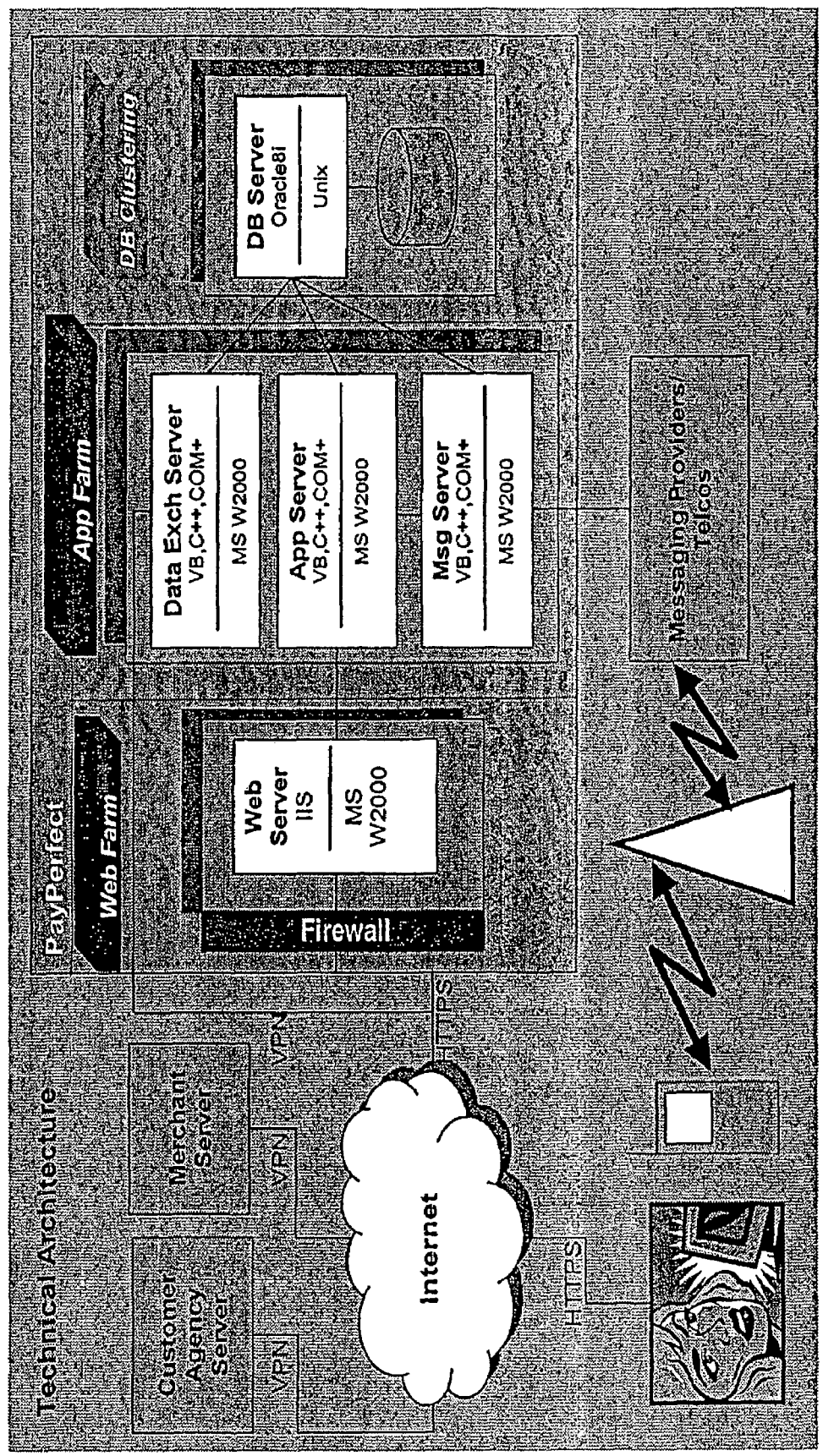
FIG. 8 is a schematic illustration of technical architecture suitable for implementing the invention.

The architecture is illustrated in more detail in FIG. 8.

Web Server

Microsoft Internet Information Services (IIS) provides the web server. The web pages are coded in standard HTML (Hypertext Markup Language) and Active Server Page (ASP) server-side scripts. To complete most transactions, the ASP scripts invoke PayPerfect business logics that reside in the Application Server. This design principle allows PayPerfect to divide the transaction load across several servers. Scalability as such is not restricted by the limitation of hardware available.

To ensure that resources are utilized fully and evenly, and the technology solution can be scaled horizontally (i.e., server farm approach) when the need arises, load-balancing services can be deployed.

Microsoft Network Load Balancing Service (NLBS), a feature of Windows 2000, can be used to provide load balancing and clustering for traffic coming into PayPerfect from the Internet. NLBS, which is used widely in mission critical enterprise-class applications, dynamically distributes IP traffic across multiple cluster web servers (nodes), and provides automatic fail over in case of node failure. NLBS also provides multi-homed server and rolling upgrade support, ease of use and controllability.

Application Server

The Application Server, which contains most of the business logic, runs on a Windows 2000 technical platform. Business rules are encapsulated into components that are developed based on Microsoft COM+ architecture.

Data Exchange Server

The Data Exchange Server provides all the necessary services (such as clearing and settlement services) to integrate and communicate with merchants and customer agencies. The initial implementation includes standard data exchange protocols such as FTP, HTTP and XML.

Messaging Server

The Messaging Server provides the necessary interfaces to messaging providers and/or telcos. In a simple embodiment, one-way sending of simple text messages may be sent over existing mobile networks (such as GSM, CDMA, Email and Pager). In a more complex embodiment, interactive messaging and value-added services based on SIM Toolkit Application (STK) and Wireless Application Protocol (WAP) can be added.

Database Server

The database server runs ORACLE®8i as its database management system (DBMS). The database sits on a UNIX-based operating system.

It is to be understood that various alterations, modifications and/or additions may be introduced into the constructions and arrangements of parts previously described without departing from the spirit or ambit of the invention.

The invention claimed is:

1. A method of making a payment over the Internet from a payer to a payee, including the following steps:

the payer accesses an Internet server from a computer or Internet device associated with the payer and transmits to the Internet server details of a proposed payment including an identifier associated with the payer;

the payer's identifier, an identifier associated with the payee, and the payment amount are transmitted from the Internet server to an authentication agency;

the authentication agency creates an authentication code relating to the payment and transmits it to a communications device associated with the payer;

the payer receives the authentication code on the payer's communications device and transmits it, together with a secret identification code back to the authentication agency;

the authentication agency verifies the authentication code and the secret identification code and authorizes payment; and a customer agency pays the payment amount to the payee; wherein the payer's communications device is one of the following types of mobile communications devices; a mobile telephone, a personal digital assistant, a pager, or a palmtop computer.

2. The method of claim 1, wherein the authentication agency, after transmitting the authentication code to the payer's communications device, transmits a message to the payer's computer or Internet device prompting the payer to enter the authentication code and the payer's secret identification code, whereafter the authentication code and the secret identification code are transmitted back from the payer's computer or Internet device to the authentication agency over the Internet.

3. A method of making a payment over the Internet from a payer to a payee, including the following steps:

the payer enters into an Internet Web site details of a proposed payment including an identifier associated with the payer;

the payer's identifier, an identifier associated with the payee, and the payment amount are transmitted from the Internet Web site to an authentication agency;

the authentication agency transmits a request for a secret identification code to the payer's computer or Internet device or a mobile communications device associated with the payer;

the payer transmits the payer's secret identification code back to the authentication agency using the payer's mobile communications device;

the authentication agency verifies the secret identification code and authorizes payment; and a customer agency pays the payment amount to the payee.

4. The method of claim 3, wherein the payer's mobile communications device is one of the following types of mobile communications devices:

a mobile telephone;
a personal digital assistant;
a pager; or
a palmtop computer.

5. A method of making an electronic payment for the purchase of goods and/or services by a purchaser from a vendor, including the following steps:

the purchaser enters into a machine associated with the vendor details of a proposed payment including an identifier associated with the purchaser;

the purchaser's identifier, an identifier associated with the vendor, and the payment amount are transmitted from the vendor's machine to an authentication agency;

the authentication agency transmits a request for a secret identification code to the vendor's machine or a mobile communications device associated with the purchaser;

the purchaser transmits the purchaser's secret identification code back to the authentication agency using the purchaser's mobile communications device;

the authentication agency verifies the secret identification code and authorizes payment; and a customer agency pays the payment amount to the vendor.

6. The method of claim 5, wherein the purchaser's mobile communications device is one of the following types of mobile communications devices:

a mobile telephone;
a personal digital assistant;
a pager; or
a palmtop computer.

7. A method of an account holder with a financial institution withdrawing cash from an automatic teller machine, including the following steps:

the account holder enters into the automatic teller machine details of a proposed withdrawal including an identifier associated with the account holder;

the account holder's identifier is transmitted from the automatic teller machine to an authentication agency;

the authentication agency transmits a request for a secret identification code to the automatic teller machine or a mobile communications device associated with the account holder;

the account holder transmits the account holder's secret identification code back to the authentication agency using the account holder's mobile communications device;

the authentication agency verifies the secret identification code and authorizes payment; and the automatic teller machine dispenses cash to the account holder and the account holder's account with the financial institution is debited accordingly.

8. The method of claim 7, wherein the account holder's mobile communications device is one of the following types of mobile communications devices:

a mobile telephone;
a personal digital assistant;
a pager; or
a palmtop computer.

* * * * *